United States Patent
Kim

(10) Patent No.: US 9,140,355 B2
(45) Date of Patent: Sep. 22, 2015

(54) AUTOMATIC TRANSMISSION LEVER ASSEMBLY HAVING SHIFT-LOCK CAM USING ELECTROMAGNET

(75) Inventor: Jisoo Kim, Daegu (KR)

(73) Assignee: Kyung Chang Industrial Co., Ltd., Daegu (KR)

( * ) Notice: Subject to any disclaimer, the term of this patent is extended or adjusted under 35 U.S.C. 154(b) by 309 days.

(21) Appl. No.: 13/540,391

(22) Filed: Jul. 2, 2012

(65) Prior Publication Data

US 2014/0000403 A1  Jan. 2, 2014

(51) Int. Cl.
- *B60K 20/00* (2006.01)
- *G05G 5/00* (2006.01)
- *F16H 61/22* (2006.01)

(52) U.S. Cl.
CPC .......... *F16H 61/22* (2013.01); *F16H 2061/223* (2013.01); *Y10T 74/20085* (2015.01)

(58) Field of Classification Search
CPC . F16H 2059/0282; F16H 61/18; F16H 63/36; F16H 2061/223; F16H 61/16; F16H 63/3475; F16H 63/48; F16H 2061/185; F16H 59/02; F16D 27/004; G05G 5/02; G05G 5/08; B60R 25/066
USPC ............... 74/473.21, 473.22, 473.23, 473.27; 192/220, 220.2, 220.3, 220.4
See application file for complete search history.

(56) References Cited

U.S. PATENT DOCUMENTS

| | | | |
|---|---|---|---|
| 5,494,141 A * | 2/1996 | Osborn et al. | 192/220.4 |
| 5,718,312 A * | 2/1998 | Osborn et al. | 192/220.4 |
| 5,938,562 A * | 8/1999 | Withey | 477/96 |
| 6,182,527 B1 | 2/2001 | Sander | |
| 6,374,978 B1 * | 4/2002 | Spencer | 192/220.3 |
| 6,658,952 B2 * | 12/2003 | Hayashi et al. | 74/336 R |
| 6,701,798 B2 * | 3/2004 | Meyer | 74/473.21 |
| 6,827,195 B2 * | 12/2004 | Kliemannel | 192/220.4 |
| 6,879,480 B2 * | 4/2005 | Kalia | 361/160 |
| 7,328,782 B2 * | 2/2008 | De Jonge | 192/220.4 |
| 2004/0069088 A1 | 4/2004 | Meyer | |
| 2004/0079613 A1 * | 4/2004 | Cho | 192/220.7 |
| 2004/0226801 A1 * | 11/2004 | De Jonge et al. | 192/220.7 |
| 2006/0016287 A1 * | 1/2006 | Grossman et al. | 74/473.21 |
| 2008/0006112 A1 * | 1/2008 | Mitteer | 74/473.1 |
| 2011/0005890 A1 * | 1/2011 | Volz et al. | 192/218 |

FOREIGN PATENT DOCUMENTS

| | | |
|---|---|---|
| EP | 0 709 597 A1 | 5/1996 |
| JP | 2007-030634 A | 2/2007 |
| KR | 20-0373783 | 1/2005 |

* cited by examiner

*Primary Examiner* — Justin Krause

(74) *Attorney, Agent, or Firm* — Mintz Levin Cohn Ferris Glovsky and Popeo, P.C.

(57) ABSTRACT

Disclosed therein is an automatic transmission lever assembly having a shift-lock cam having an electromagnet. The automatic transmission lever assembly includes: a base bracket fixed to a frame of a vehicle; a rod; a rotating member joined to a lower end of the rod, the rotating member rotating on a predetermined shaft according to a movement of the rod for changing a transmission mode and having a locking portion formed at a position corresponding to a shift-lock; a shift-lock cam having a permanent magnet, the shift-lock cam being caught to the locking portion at a shift-lock position and being rotatable on the shaft; and an electromagnet provided at a position facing the permanent magnet, wherein when a brake signal is transferred, electric current flows to the electromagnet, so that the shift-lock cam is operated in a direction to be released from the locking portion.

1 Claim, 3 Drawing Sheets

AUTOMATIC TRANSMISSION LEVER ASSEMBLY HAVING SHIFT-LOCK CAM USING ELECTROMAGNET

BACKGROUND OF THE INVENTION

1. Field of the Invention

The present invention relates to an automatic transmission lever assembly for a vehicle. More particularly, the present invention relates to an automatic transmission lever assembly having a shift-lock cam having an electromagnet.

2. Background Art

In general, a lever assembly arranged near a driver's seat of a vehicle for manipulating an automatic transmission has various types of movement traces, such as a straight lever type that a lever moves in a straight line, a gate lever type that the lever moves in a zigzag form, a manual transmission mode type, and so on. An automatic transmission lever includes a shift-lock device, which enables the vehicle to change gear to a neighboring gear from a specific gear only when the driver steps the brake in order to prevent sudden acceleration incidents. For instance, when the transmission lever moves from a P gear, which is a parking gear, to a D gear, which is a driving gear, or moves from an N gear, which is a neutral gear, to an R gear, which is a reverse gear, the transmission lever can move only when the driver steps the brake.

The shift-lock device according to a prior art has a structure that a solenoid pulls a shift-lock cam to rotate the lever assembly when the driver steps the brake and the lever assembly returns to its original position by a return spring disposed inside the solenoid when the driver releases the brake. However, the shift-lock device according to the prior art has a problem in that the solenoid produces noise and vibration when the solenoid is actuated.

SUMMARY OF THE INVENTION

Accordingly, the present invention has been made to solve the above-mentioned problems occurring in the prior arts, and it is an object of the present invention to provide an automatic transmission lever assembly having a shift-lock cam using an electromagnet.

To accomplish the above object, according to the present invention, there is provided an automatic transmission lever assembly having a shift-lock cam using an electromagnet including: a base bracket fixed to a frame of a vehicle; a rod; a rotating member joined to a lower end of the rod, the rotating member rotating on a first predetermined shaft according to a movement of the rod for changing a transmission mode and having a locking portion formed at a position corresponding to a shift-lock; a shift-lock cam having a permanent magnet, the shift-lock cam being caught to the locking portion at a shift-lock position and being rotatable on a second predetermined shaft; and an electromagnet provided at a position facing the permanent magnet. When a brake signal is transferred, electric current flows to the electromagnet, so that the shift-lock cam is operated in a direction to be released from the locking portion.

In another aspect of the present invention, there is provided an automatic transmission lever assembly having a shift-lock cam using an electromagnet including: a base bracket; a rod; a knob button provided to an end portion of the rod; a detent pin being vertically movable according to operation of the knob button; a shift-lock cam making the detent pin being caught at a shift-lock position so as to prevent the knob button from being pressed, the shift-lock cam having a permanent magnet; and an electromagnet provided at a position facing the permanent magnet. Moreover, when a brake signal is transferred, electric current flows to the electromagnet, so that the shift-lock cam is operated in a direction to be released from the locking portion.

The automatic transmission lever assembly having the shift-lock cam using the electromagnet according to the present invention does not produce noise and vibration of the solenoid because the shift-lock cam is operated not by the solenoid but by the electromagnet and the permanent magnet.

BRIEF DESCRIPTION OF THE DRAWINGS

The above and other objects, features and advantages of the present invention will be apparent from the following detailed description of the preferred embodiments of the invention, in conjunction with the accompanying drawings, in which.

DETAILED DESCRIPTION OF THE EMBODIMENTS

Hereinafter, reference will be now made in detail to the embodiments of the present invention with reference to the attached drawings. Other components of an automatic transmission lever assembly, which are not related with essentials of the present invention, will not be described, and the undescribed components may be applied to the present invention by borrowing the prior arts as they are or by modifying the prior arts in such a way as to be suitable for the present invention.

Figure 1:
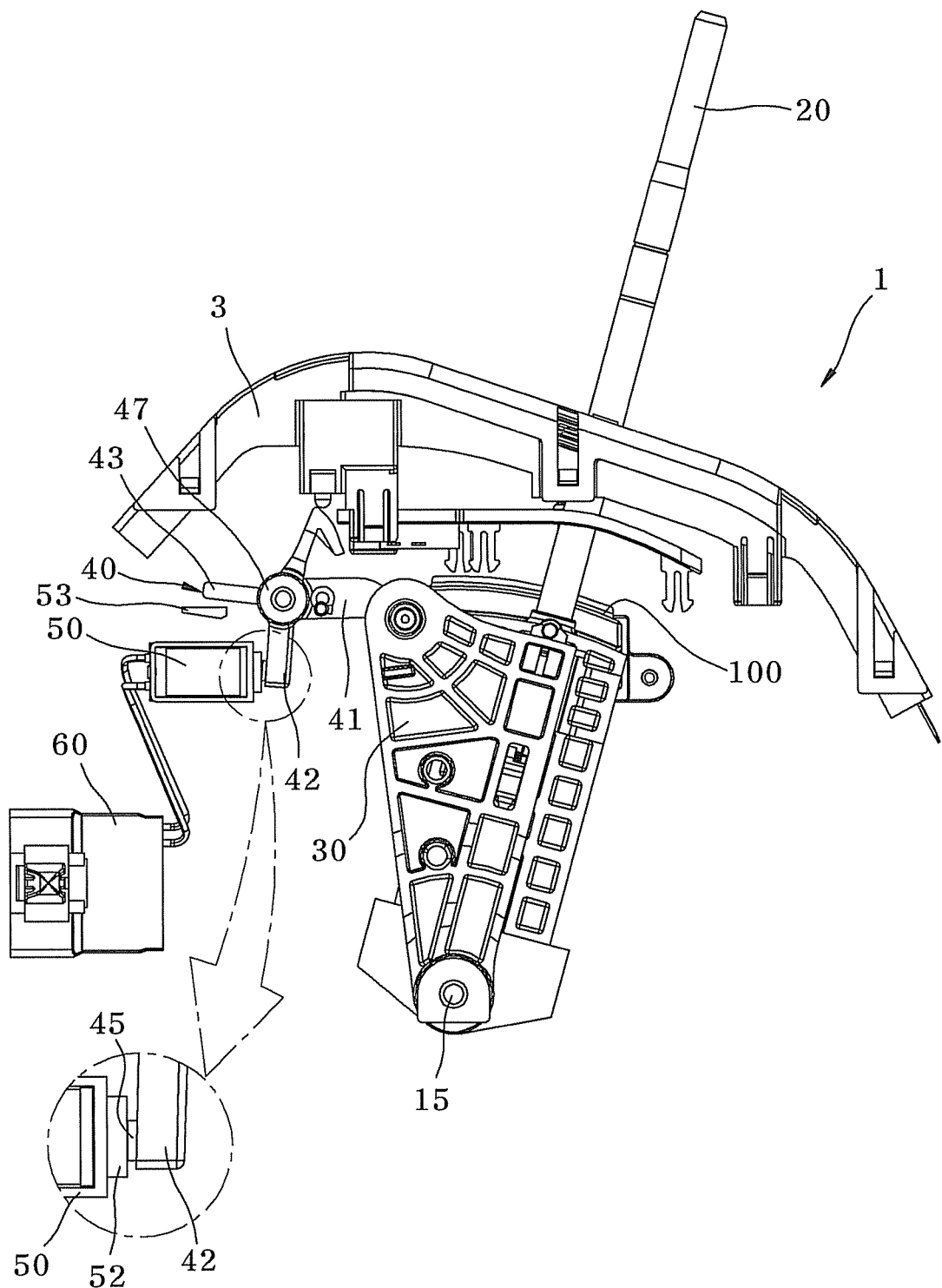
FIG. 1 is a partial side view of a lever assembly on which a shift-lock device according to a first preferred embodiment of the present invention is mounted.

FIG. 1 is a partial side view of a lever assembly on which a shift-lock device according to a first preferred embodiment of the present invention is mounted. In FIG. 1, the lever assembly is a gate lever type that a lever makes a movement trace in a zigzag form. As shown in FIG. 1, the lever assembly 1 according to the present invention includes a base bracket (not shown), a rod 20, a rotating member 30, a shift-lock cam 40, an electromagnet 50, and a connector 60.

The rod 20 includes a knob (not shown) mounted at an end portion thereof so that a driver grasps it to control movement of the rod 20. The rotating member 30 is joined to a lower end of the rod 20 rotates on a shaft 15 according to the movement of the rod 20 for changing a transmission mode and includes a locking portion 150 (see FIG. 2) formed at a position corresponding to the shift-lock. It is preferable that the locking portion 150 is a retaining jaw formed in such a fashion that an arm 41 of the shift-lock cam 40, which will be described later, is caught, but the locking portion 150 is not limited to the specific form.

The shift-lock cam 40 includes the first arm 41, which is caught to the locking portion 150 to prevent rotation of the rotating member 30, a second arm 42 to which a permanent magnet is attached, and a third arm 43. The second arm 42 is arranged to face the electromagnet 50, and the permanent magnet 45 is attached to the second arm 42 to face the electromagnet 50. When the second arm 42 gets in contact with the electromagnet 50, the third arm 43 becomes in noncontact with a noise preventing pad 53 provided to the base bracket. When the second arm 42 gets in noncontact with the electromagnet 50, the third arm 43 becomes in contact with the noise preventing pad 53. However, the third arm 43 may be always in noncontact with the electromagnet 50. Moreover, the noise preventing pad 53 may be provided not to the base bracket but to an upper portion of the electromagnet.

It is preferable that the electromagnet 50 further include another noise preventing pad 52 disposed at a portion facing the second arm 42 of the shift-lock cam 40. The noise preventing pad 52 can secure a smooth operation because it prevents not only noise but also a direct contact between the permanent magnet 45 and the electromagnet 50. When the shift-lock cam 40 gets in direct contact with the electromagnet 50, the electromagnet has a possibility to become a permanent magnet due to magnetization of metals inside the electromagnet, and hence, it is preferable that the permanent magnet 45 is prevented from being in direct contact with the electromagnet 50.

A torsion spring may be adjunctively provided to a rotary shaft 47 of the shift-lock cam 40. That is, when an electric current does not flow to the electromagnet 50, the shift-lock cam 40 returns to its original position due to gravity that the permanent magnet 45 tends to face metals inside the electromagnet, and in this instance, in order to facilitate the returning of the shift-lock cam 40, the torsion spring may be adjunctively mounted.

The connector 50 is connected with a brake side, and makes the electric current flow to the electromagnet to make the electromagnet 50 be magnetic when the brake (not shown) is operated but prevents the electric current from flowing to the electromagnet when the brake stops the operation. In this embodiment, magnetism formed at the electromagnet 50 is magnetism generating repulsive force against the permanent magnet 45.

In the meantime, according to a modification of the first preferred embodiment, the electromagnet may be mounted on the shift-lock cam 40 and the permanent magnet may be arranged at the position facing the electromagnet, and hence, such an arrangement belongs to the scope of the present invention.

Figure 2:
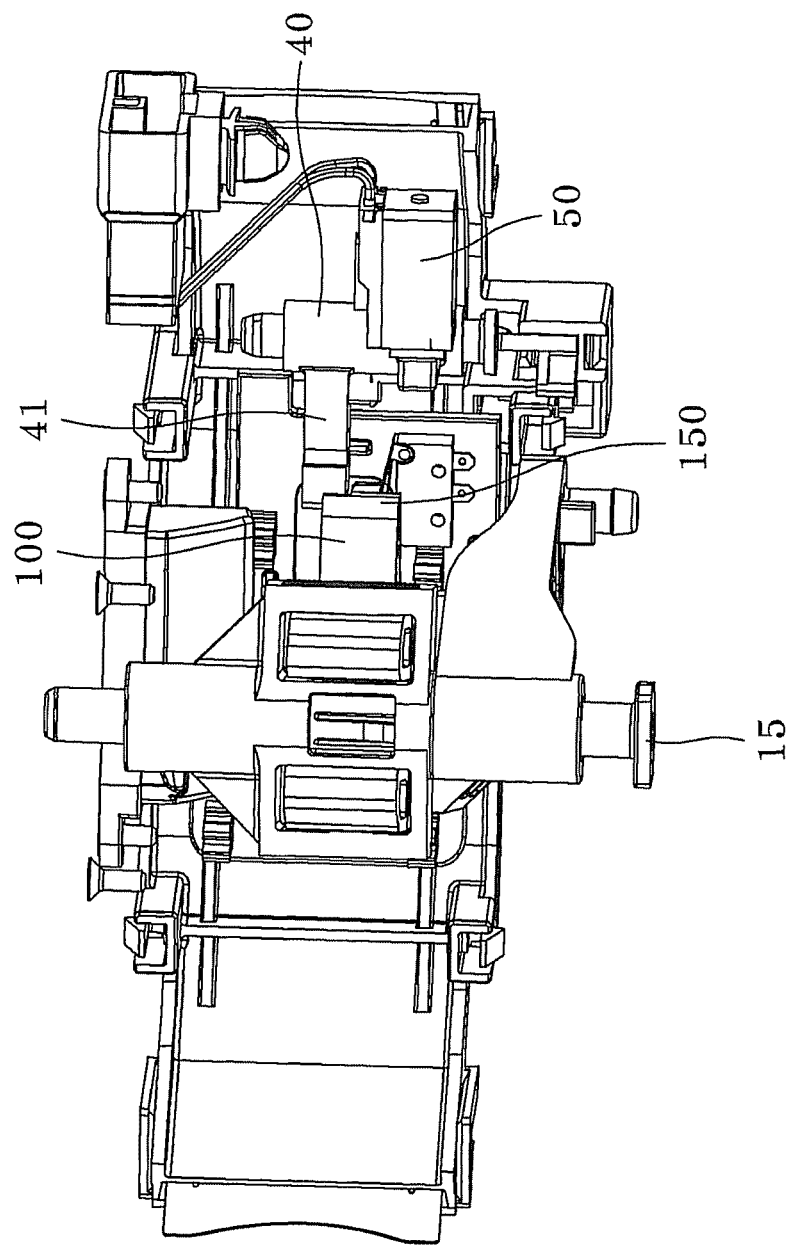
FIG. 2 is a bottom view of the lever assembly of FIG. 1.

Next, the operation of the device illustrated in FIGS. 1 and 2 will be described.

When the driver steps the brake, a signal of the brake is transferred through the connector 60, and then, electric current flows into the electromagnet 50.

When the electric current flows into the electromagnet 50, the electromagnet 50 becomes magnetic so as to generate a repulsive force against the permanent magnet 45 of the shift-lock cam 40, so that the shift-lock cam 40 is rotated in the counterclockwise direction of FIG. 1. When the shift-lock cam 40 is rotated in the counterclockwise direction, the first arm 41, which is caught to the retaining jaw 150 of the rotating member 30 to prevent rotation of the rotating member 30, is lifted up and the rotating member 30 is rotatable on the rotary shaft 15. In the above state, when the driver actuates the transmission lever, the rotating member 30 rotates to a wanted position, so that the transmission mode is changeable. The retaining jaw 150 is provided to a position corresponding to a gear, which requires shift-lock, but is not provided to a gear, which does not require shift-lock. When the brake is stopped, electric current does not flow to the electromagnet 50, and hence, gravity is applied between the permanent magnet 45 of the shift-lock cam 40 and the electromagnet 50, so that the shift-lock cam 40 returns to its original position. When the torsion spring is adjunctively provided, the shift-lock cam 40 can return to its original position more smoothly. In this instance, when the second arm 42 returns to the electromagnet 50, the permanent magnet 45 gets in contact with the noise preventing pad 52.

If the electromagnet is provided to the shift-lock cam 40 and the permanent magnet is arranged to fact the electromagnet, the present invention may provide a structure to release the shift-lock in such a way as to be suitable for the arrangement.

Figure 3:
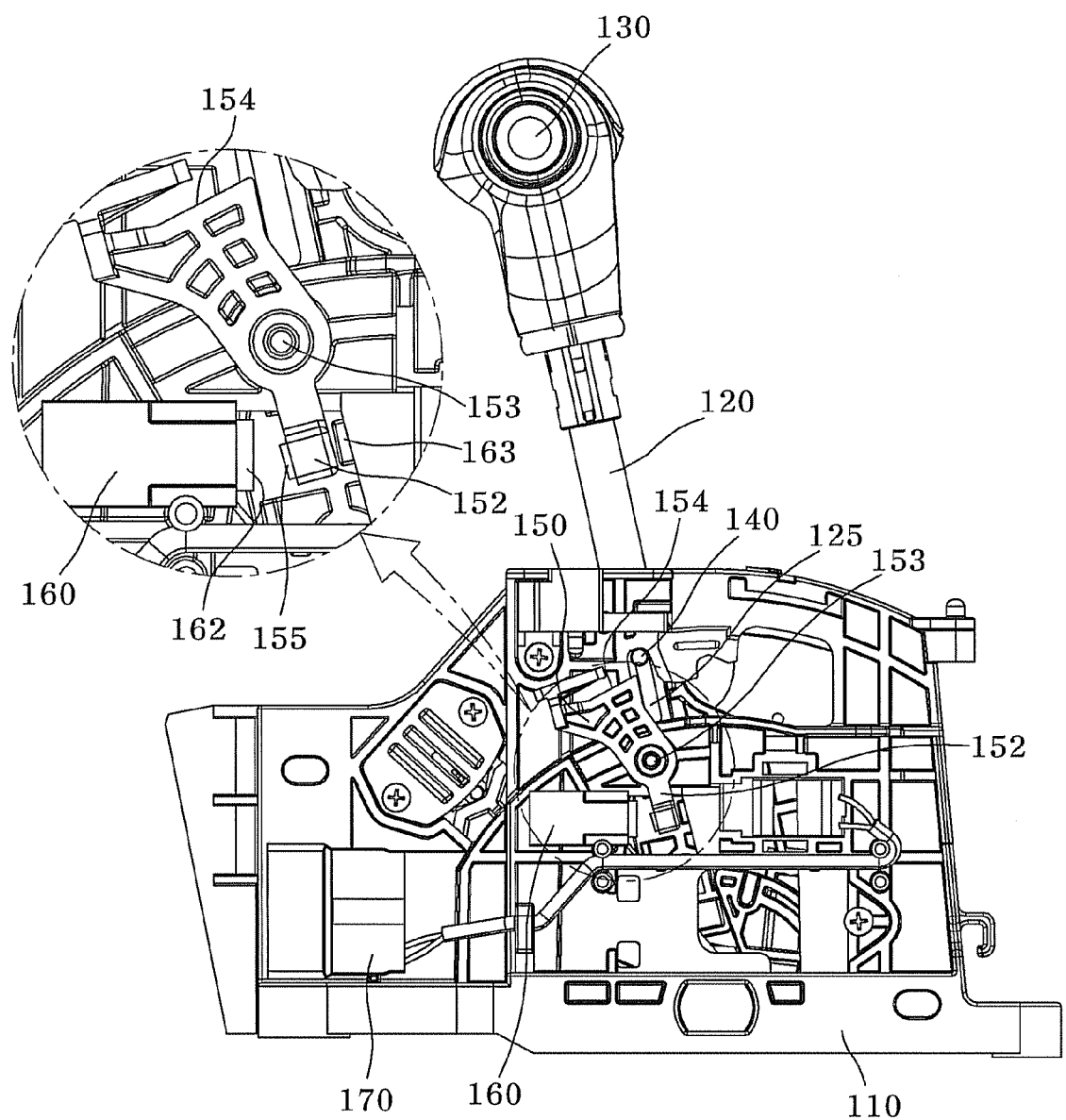
FIG. 3 is a side view of a lever assembly on which a shift-lock device according to a second preferred embodiment of the present invention is mounted.

FIG. 3 is a side view of a lever assembly according to a second preferred embodiment of the present invention. FIG. 3 illustrates a straight lever type that a movement race of the transmission lever is in a straight line. The straight lever type enables the driver to change speed between specific gears by pressing a push button provided to the knob of the transmission lever.

As shown in FIG. 3, the transmission lever assembly according to the second preferred embodiment includes a base bracket 110, a rod 120, a knob button 130 provided to an end portion of the rod 120, a detent pin 140 vertically movable according to an operation of the knob button 130, a shift-lock cam 150, an electromagnet 160, and a connector 170.

The rod 120 includes a guide 125, and the detent pin 140 slidably moves along the guide 125. The shift-lock cam 150 is rotatable on a rotary shaft 153, and includes an arm 152 facing the electromagnet 160 and a permanent magnet 155 provided to the arm 152.

It is preferable that the electromagnet 160 includes a noise preventing pad 162 facing the shift-lock cam 150. The noise preventing pad 162 serves the same function as the noise preventing pad 52, which is described previously.

The shift-lock cam 150 includes a retaining jaw 154. When the detent pin 140 is caught to the retaining jaw 154, it prevents a change of transmission modes because the detent pin 140 cannot move even though the driver pushes the knob button 130. In this instance, when the driver steps the brake, a signal of the brake is transferred through the connector 170, and then, electric current flows into the electromagnet 160. When the electric current flows into the electromagnet 160, the electromagnet 50 generates a repulsive force against the permanent magnet 155, so that the shift-lock cam 150 is rotated on the rotary shaft 153 in the counterclockwise direction. Then, as shown in FIG. 3, the detent pin 140 is released from the retaining jaw 154, and when the driver pushes the knob button 130, the detent pin 140 slides downward along the guide 125 to thereby change gears.

Also in the second preferred embodiment, the arrangement of the electromagnet and the permanent magnet may be reversed.

While the present invention has been described with reference to the particular illustrative embodiments, it is not to be restricted by the embodiments and/or drawings but only by the appended claims. It is to be appreciated that those skilled in the art can make various modifications, changes and equivalents without departing from the spirit and scope of the present invention, as set forth in the appended claims.

What is claimed is:

1. An automatic transmission lever assembly, comprising:
   a base bracket fixed to a frame of a vehicle;
   a rod;
   a rotating member joined to a lower end of the rod, the rotating member rotating on a first shaft according to a movement of the rod for changing a transmission mode and having a locking portion formed at a position corresponding to a shift-lock;
   a shift-lock cam having a first arm caught to the locking portion to prevent rotation of the rotating member and a second arm to which a permanent magnet is attached, the shift-lock cam being caught to the locking portion at a shift-lock position and being rotatable on a second shaft; and an electromagnet having a noise preventing pad to be contacted with the second arm and provided at a position facing the permanent magnet,
wherein when a brake signal is transferred, electric current flows to the electromagnet, so that the first arm and the second arm of the shift-lock cam rotate on the second shaft in a direction where the locking portion is released.

* * * * *